(12) United States Patent
Kenkre et al.

(10) Patent No.: US 11,354,502 B2
(45) Date of Patent: *Jun. 7, 2022

(54) AUTOMATED CONSTRAINT EXTRACTION AND TESTING

(71) Applicant: International Business Machines Corporation, Armonk, NY (US)

(72) Inventors: Sreyash Kenkre, Bangalore (IN); Santosh R. K. Penubothula, Bangalore (IN); Disha Shrivastava, Bangalore (IN); Harish Guruprasad Ramaswamy, Bangalore (IN); Vinayaka Pandit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/130,470

(22) Filed: Dec. 22, 2020

(65) Prior Publication Data

US 2021/0110109 A1 Apr. 15, 2021

Related U.S. Application Data

(63) Continuation of application No. 16/186,924, filed on Nov. 12, 2018, now Pat. No. 10,902,200.

(51) Int. Cl.
*G06F 40/30* (2020.01)
*G06F 16/93* (2019.01)
(Continued)

(52) U.S. Cl.
CPC .......... *G06F 40/242* (2020.01); *G06F 16/248* (2019.01); *G06F 16/2455* (2019.01);
(Continued)

(58) Field of Classification Search
CPC ....... G06F 40/30; G06F 16/93; G06F 40/0242
See application file for complete search history.

(56) References Cited

U.S. PATENT DOCUMENTS 6,076,088 A 6/2000 Paik et al.
8,694,347 B2 4/2014 Kennis et al.
(Continued)

OTHER PUBLICATIONS

K. R. Bouzidi et al., "Towards a Semantic-based Approach for Modeling Regulatory Documents in Building Industry," Cornell University Library, 2013. 8 pages.

T. D. Breaux et al., "A Systematic Method for Acquiring Regulatory Requirements: A Frame-Based Approach," 6th International Workshop on Requirements for High Assurance Systems (RHAS-6), 2007. 6 pages.

(Continued)

*Primary Examiner* — Bryan S Blankenagel
(74) *Attorney, Agent, or Firm* — Ryan, Mason & Lewis, LLP

(57) ABSTRACT

Methods, systems and computer program products for automatic extraction and testing of constraints are provided herein. A computer-implemented method includes obtaining a first set of documents describing constraints and a second set of documents describing properties of entities, building a first dictionary of entity types and a second dictionary of relations among the entity types, extracting constraint triples representing the set of constraints from the first set of documents, and extracting fact triples from the second set of documents utilizing the first dictionary and the second dictionary. The method also includes receiving a query to evaluate whether at least one of the set of constraints is satisfied, determining whether the at least one constraint is satisfied by evaluating a constraint satisfaction formula utilizing the constraint triples and the fact triples, and providing a response to the query that indicates whether the at least one constraint is satisfied.

17 Claims, 10 Drawing Sheets

(51) Int. Cl.
*G06F 40/242* (2020.01)
*G06F 16/248* (2019.01)
*G06F 16/2455* (2019.01)
*G06F 40/295* (2020.01)

(52) U.S. Cl.
CPC ............ *G06F 16/93* (2019.01); *G06F 40/295* (2020.01); *G06F 40/30* (2020.01)

(56) References Cited

U.S. PATENT DOCUMENTS

| | | |
|---|---|---|
| 9,965,726 B1 | 5/2018 | Tablan et al. |
| 2003/0158841 A1 | 8/2003 | Britton et al. |
| 2011/0055093 A1 | 3/2011 | Kling et al. |
| 2011/0255788 A1 | 10/2011 | Duggan et al. |
| 2011/0255794 A1 | 10/2011 | Neogi et al. |
| 2016/0132572 A1 | 5/2016 | Chang et al. |
| 2016/0342628 A1 | 11/2016 | Van Rest et al. |
| 2017/0132115 A1 | 5/2017 | Misra et al. |
| 2017/0177715 A1* | 6/2017 | Chang ............... G06N 5/04 |
| 2017/0293610 A1 | 10/2017 | Tran |
| 2018/0181648 A1* | 6/2018 | Chen ............... G06F 16/951 |
| 2018/0260820 A1 | 9/2018 | Keating et al. |
| 2019/0236460 A1 | 8/2019 | Jagota et al. |
| 2019/0347284 A1 | 11/2019 | Roman et al. |

OTHER PUBLICATIONS

K. LR. Bouzidi et al., "Semantic Web Approach to Ease Regulation Compliance Checking in Construction Industry," Future Internet—Special Issue Semantic Interoperability and Knowledge Building, 2012. 24 pages.

T. Mitchell et al., "Never-Ending Learning," 2015. 9 pages.

M. Schmitz et al., "Open Language Learning for Information Extraction," Proceedings of the 2012 Joint Conference on Empirical Methods in Natural Language Processing and Computational Natural Language Learning, 2012. 12 pages.

A. Fader et al., "Identifying Relations for Open Information Extraction," Proceedings of the Conference on Empirical Methods in Natural Language Processing, 2011. 11 pages.

G. G. Angeli, "Learning Open Domain Knowledge from Text," Dissertation, Stanford University, 2016. 140 pages.

M. Nickel et al., "A Review of Relational Machine Learning for Knowledge Graphs," arXiv preprint arXiv:1503 00759 (2015). 23 pages.

Fahad, M. & Bus, N. Conformance Checking of IFC Models via Semantic BIM Reasoner.

Pauwels, P. & Zhang, S. (2015). Semantic Rule-Checking for Regulation Compliance Checking an Overview of Strategies and Approaches. In 32nd International CIBW78 Conference.

List of IBM Patents or Patent Applications Treated as Related.

* cited by examiner

AUTOMATED CONSTRAINT EXTRACTION AND TESTING

FIELD

The present invention relates to information technology, and, more particularly, to processing regulations.

BACKGROUND

The proliferation of regulations in a wide variety of application areas presents challenges not only for identifying rules or other constraints, but also for testing or determining whether such rules or other constraints are satisfied. Emerging technologies in some cases lead to the creation of multiple regulatory bodies or other governing documents for a particular application area. The technical and legal documents that define governing laws, rules or other specifications and constraints are continually updated and revised to account for such emerging technologies. In addition, entities that are governed by such constraints may vary over time. There is thus a need for systems to automatically extract and test constraints.

SUMMARY

Embodiments of the invention provide techniques for automatically extracting constraints and for testing satisfaction of such constraints.

In one embodiment, an exemplary computer-implemented method comprises steps of obtaining a first set of documents describing a set of constraints and a second set of documents describing properties of instances of a plurality of entities, building a first dictionary of entity types and a second dictionary of relations among the entity types utilizing the first set of documents, extracting a set of constraint triples representing the set of constraints from the first set of documents, a given constraint triple identifying a relation in the second dictionary that links two of the entity types in the first dictionary, extracting a set of fact triples from the second set of documents utilizing the first dictionary and the second dictionary, a given fact triple identifying a relation from the second dictionary that links an entity instance to an entity type in the first dictionary, receiving a query to evaluate whether at least one of the set of constraints is satisfied, determining whether said at least one constraint is satisfied by evaluating at least one constraint satisfaction formula utilizing the set of constraint triples and the set of fact triples, and providing a response to the query, the response comprising an indication of whether said at least one constraint is satisfied. The steps are carried out by at least one computing device.

In another embodiment, an exemplary computer-implemented method comprises steps of receiving a query to evaluate whether at least one of a set of constraints is satisfied, said at least one constraint being associated with a given constraint triple extracted from a first set of documents, the given constraint triple identifying a relation that links two entity types, identifying a subset of a set of fact triples extracted from a second set of documents having a same relation as the given constraint triple, hypernym tracing the subset of fact triples to link entity instances in the subset of fact triples to the entity types of the given constraint triple, marking the given constraint triple as satisfied responsive to determining that the subset of fact triples includes: a first fact triple having the same relation as the given constraint triple; a second fact triple that links a first entity instance of an object of the second fact triple to an entity type of an object of the given constraint triple using at least one hypernym; and a third fact triple that links a second entity instance of a subject of the third fact triple to an entity type of the subject of the given constraint triple using at least one hypernym, and providing a response to the query, the response comprising an indication of whether said at least one constraint is satisfied. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF TIE DRAWINGS

DETAILED DESCRIPTION

Figure 1:
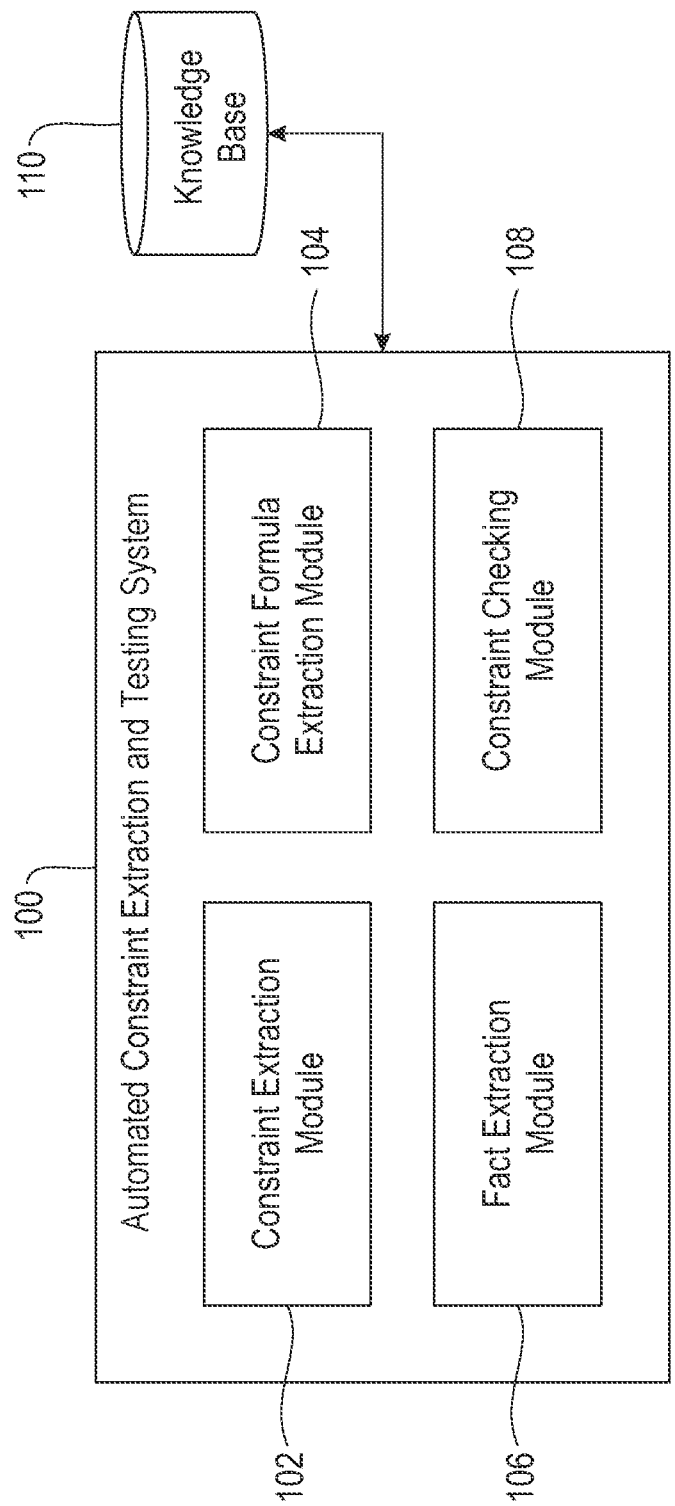
FIG. 1 depicts a system for automated constraint extraction and testing, according to an exemplary embodiment of the present invention.

Illustrative embodiments of the invention may be described herein in the context of illustrative methods, systems and devices for automated extraction and testing of constraints. However, it is to be understood that embodiments of the invention are not limited to the illustrative methods, systems and devices but instead are ore broadly applicable to other suitable methods, systems and devices.

Regulatory documents specify constraints (e.g., in text) that an entity should satisfy for some purpose. Checking if these constraints are satisfied is a complex issue, as it requires a complete understanding of the constraints and the entity being considered. As discussed above, the proliferation of technical documents (e.g., cyber laws, goods and service taxes (GSTs), etc.) continues as emerging technologies lead to the creation of multiple regulatory bodies due to changes in regulations, laws, etc.

Consider the following example of a constraint and an entity description relating to impounding counterfeit notes. In this example, the constraint specifies that counterfeit notes can be impounded by: (i) all branches of public sector banks; (ii) all branches of private sector banks and foreign banks; (iii) all branches of cooperative banks and regional rural banks; (iv) all treasuries and sub-treasuries; and (v) issue offices of reserve banks (e.g., an Issue Office of the Reserve Bank of India). The entity in this example is a large private-sector bank in India that offers a comprehensive suite of financial products, where the bank has a head office in Mumbai, India and a registered office in Ahmedabad. The bank has several thousand branches and automated teller machines (ATMs), along with multiple international offices. Given this constraint and entity description, the problem of determining whether a branch of this bank in Manyata Tech Park can impound counterfeit notes is a complex task which requires a complete understanding of the constraints (and the relationships between constraints) as well as the entity itself.

In some cases, questions or queries may relate to whether some technical constraint is satisfied. This presents a problem, however, as technical documents can be very large and also may have a complicated language structure. Questions or queries can also arise at different levels of a hierarchy within an entity (e.g., a business organization), and thus require propagation of the question or query to a suitable empowered authority of the entity to make a decision resulting in long turnaround times.

To resolve these issues, one approach is to employ a keyword-based search system. For example, a keyword-based search system may fetch the relevant paragraphs or other portions of a constraints document to provide results. Keyword-based search systems, however, do not provide reasoning on the fetched paragraphs or portions unless there is a step of explicit extraction of constraints from text. Keyword-based search systems are also difficult to use, and may require careful crafting of keywords to obtain useful results. Consider, for example, the following questions or queries posed to a keyword-based search system. A first query, "Can <Name of specific foreign bank> open a retail banking branch in Manyata Tech Park?" may return no results, as the constraint document may not include a keyword for the name of the specific foreign bank in the query (e.g., BNP Paribas). A second query, "Can a foreign bank open a retail banking branch in Manyata Tech Park?" may provide a detailed result as the keyword "foreign bank" may be included in a relevant section of the constraint document (e.g., possibly in conjunction with the keyword "opening branches" or similar). However, even returning the text of a particular paragraph or other portion of the constraint document does not necessarily give the user the answer to the query, as keyword-based search systems do not typically provide reasoning on results.

Illustrative embodiments provide systems and techniques for automated constraint extraction and testing. By automating the process for extracting and testing constraints, embodiments provide a number of advantages. For example, manual processes of human analysis of regulatory and description documents may be automated, thus saving time and resources. Also, the system can account for changes in regulations or constraints by dynamically monitoring a set of regulatory documents. This saves considerable time and resources, in that a static ontology or database need not be re-built from scratch whenever regulations or constraints change. Embodiments instead permit for extracting new constraints and updating relationships between constraints whenever changes to regulatory documents are detected.

In some embodiments, two types of documents are considered: (i) constraint specification documents (e.g., "regulatory" documents that describe constraints between entities or entity types); and (ii) entity specification documents (e.g., "description" documents that describe the properties of individual instances of the entity types).

Regulatory constraints are constraints and relationships connecting types of entities, where the types of entities may be obtained from a knowledge database as described in further detail below. Continuing with the banking example above, the knowledge base may store information related to entities such as names and types of banks, geographic areas, relations, regulations, "triple" facts, etc. The knowledge base, for example, may store: a listing of a set of foreign bank entities (e.g., Foreign Banks={Deutsche Bank, Wells Fargo, BNP Paribas . . . }); a listing of urban areas (e.g., Urban Areas={Delhi, Bangalore, Mumbai . . . }); a listing of relations (e.g., Relations={"can open branch", "can lend to", . . . }); a listing of regulations (e.g., Regulation: "Foreign banks are allowed to open branches in urban areas"); and "triple" facts or constraints linking information in such different lists (e.g., Triple Fact=Constraint; <Foreign banks, can open branch, urban areas>).

Entity descriptions state facts that connect individual entity instances, or which connect an instance of an entity to an entity type. Again continuing with the example above, the knowledge base may store information relating keywords or entity names in the form of "fact" triples. For example, the description "Deutsche Bank is a foreign bank operating in India" may be stored in the knowledge base as: <Deutsche Bank, is, foreign bank>. As another example, the description "Bangalore is a city in India" may be stored in the knowledge base as: <Bangalore, is, city>, <city, is, urban>.

In some embodiments ontology and linking mechanisms are used to extract constraint triples from the regulatory documents. The constraint triples are then used to guide the extraction of fact triples from the description documents. The system can then check, by substituting entities from the fact triples in the constraint triples, whether any constraints are violated.

FIG. 1 shows an automated constraint extraction and testing system 100, which includes a constraint extraction module 102, a constraint formula extraction module 104, a fact extraction module 106, and a constraint checking module 108. FIG. 1 also shows a knowledge base 110 coupled to the system 100, which may provide input to the system 100 in the form of regulatory documents (e.g., documents describing constraints) and description documents (e.g., documents describing the properties of entities involved).

In some embodiments, the knowledge base 110 is both a source of the input documents as well as a destination for constraint triples extracted by module 102, constraint formulas extracted by module 104 and fact triples extracted by module 106. In other embodiments, the knowledge base 110 is only the source of the input documents, or is only the destination for the constraint triples, constraint formulas and fact triples. For example, in some embodiments the system 100 further includes an input or parsing module which receives the input regulatory and description documents, and the knowledge base 110 stores only the constraint triples, constraint formulas and fact triples extracted from such input. It should be appreciated that the knowledge base 110 may also or alternatively represent a collection of databases or other repositories, which may be implemented using separate storage or other computing systems (e.g., separate repositories for input documents and for the constraint triples, constraint formulas and fact triples extracted therefrom, separate repositories for regulatory and description input documents, separate repositories for constraint triples, constraint formulas and fact triples, etc.).

The functionality of the constraint extraction module 102, constraint formula extraction module 104, fact extraction module 106 and constraint checking module 108 will now be described with respect to FIGS. 2-5, which show respective processing flows for the functionality provided by such modules.

Figure 2:
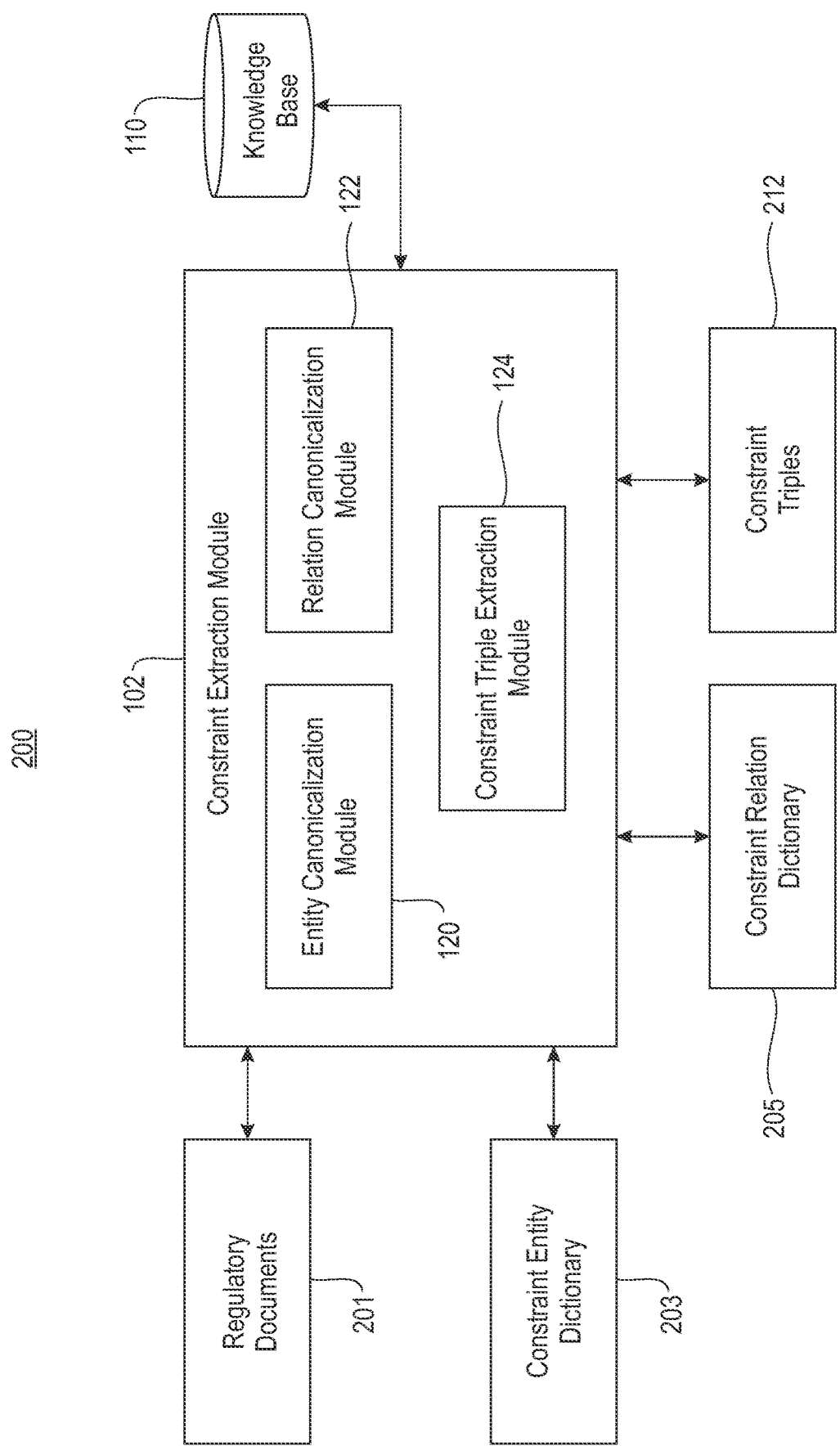
FIG. 2 depicts a processing flow for the constraint extraction module of the FIG. 1 system, according to an exemplary embodiment of the present invention.

FIG. 2 shows a processing flow 200 for the constraint extraction module 102. The constraint extraction module 102 in the FIG. 2 embodiment implements an entity canonicalization module 120, a relation canonicalization module 122, and a constraint triple extraction module 124. The knowledge base 110 is assumed to be constructed through manual annotation along with an ontology, or through an ontology for a particular domain. The entity canonicalization module 120 and relation canonicalization module 122 provide entity linking and relation identification mechanisms, respectively, for building the ontology provided by the knowledge base 110.

The knowledge base 110 and its associated ontology are used to canonicalize input regulatory documents 201 by converting the data into a standard or canonical form for entities and relations among the entities. The entity canonicalization module 120 can utilize entity linking techniques to canonicalize or identify entities, and the relation canonicalization module 122 can utilize embedding methods (e.g., word2Vec, WordNet/VerbNet, etc.) to canonicalize or identify relations. The modules 120 and 122 are thus used to build a constraint entity dictionary 203 and a constraint relation dictionary 205 which contain the canonicalized entities and relations. Although not shown, one or both of the constraint entity dictionary 203 and the constraint relation dictionary 205 may be made part of the knowledge base 110.

The canonicalized entities and relations are utilized by the constraint triple extraction module 124 to extract constraint triples from the regulatory documents 201. Dictionaries of standard terms may be used to identify if a particular constraint triple is necessary, optional, or negated. For example, a relation like "should have" contains the term "should" which is associated with necessary triples. The dictionary of standard terms may be manually constructed for a particular application, as particular terms may have different meanings in different contexts or applications.

In some embodiments, the constraint extraction module 102 may implement a keyword-based search system to filter the regulatory documents 201 prior to processing by the entity canonicalization module 120, relation canonicalization module 122, and constraint triple extraction module 124. For example, keyword-based search systems may be utilized to filter out portions of the regulatory documents 201 that do not correspond to regulations related to a particular task at hand.

Figure 3:
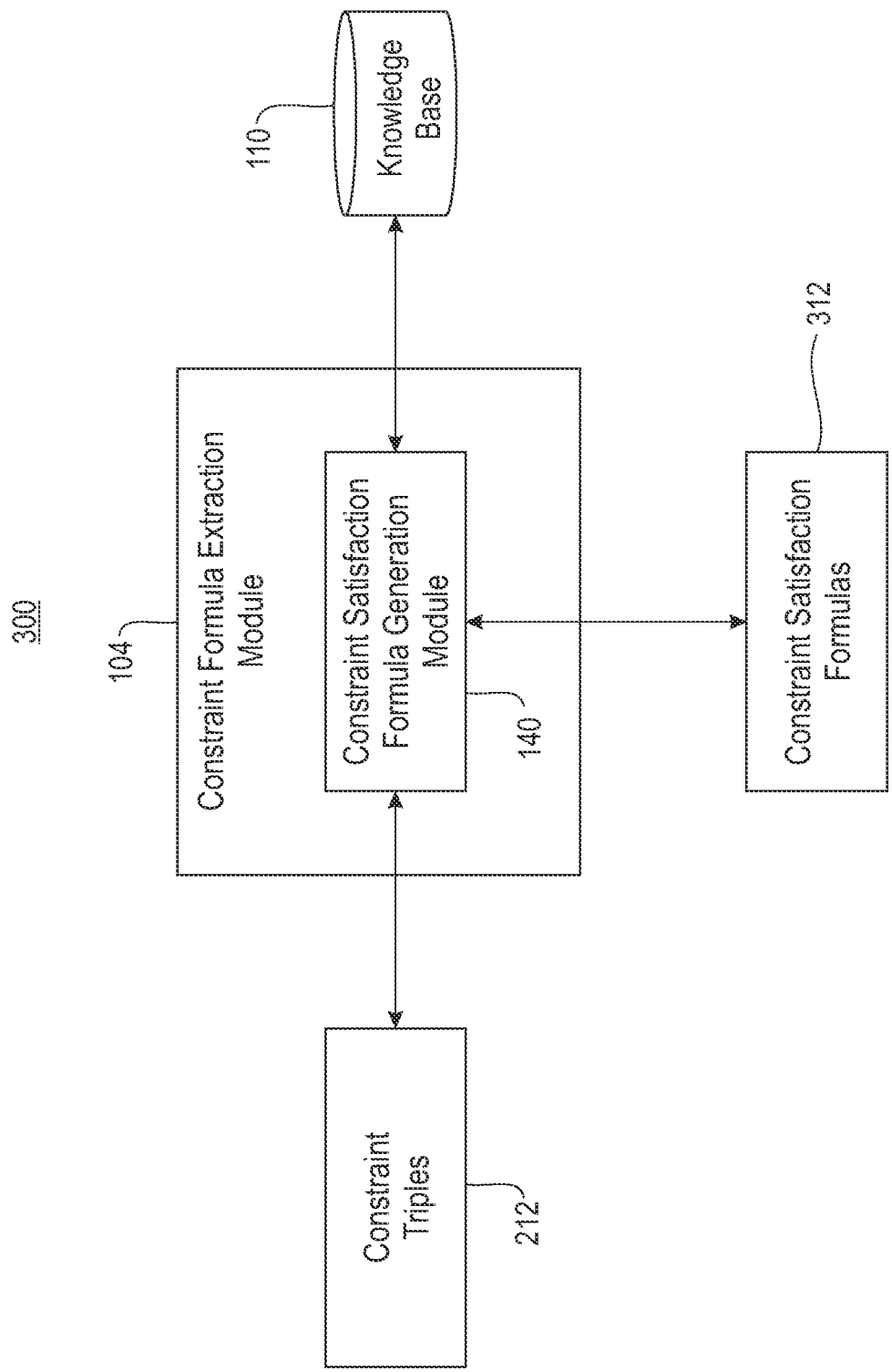
FIG. 3 depicts a processing flow for the constraint formula extraction module of the FIG. 1 system, according to an exemplary embodiment of the present invention.

FIG. 3 shows a processing flow 300 for the constraint formula extraction module 104. The constraint formula extraction module 104 implements a constraint satisfaction formula generation module 140, which forms constraint satisfaction formulas 312 for the constraint triples 212 extracted by the constraint extraction module 102. For each of the constraint triples 212 that are extracted by the constraint extraction module 102, the constraint satisfaction formula generation module 140 identifies its relation (e.g., logical OR, AND, NOT) to other constraint triples. The constraint satisfaction formula generation module 140 in some embodiments does so based on the context of the constraint triples (e.g., the location of the constraint triples in the regulatory corpus of knowledge base 110 or in regulatory documents 201). In some embodiments, the context can be specified to be a paragraph or other portion of the regulatory document 201 in which a given constraint is specified. In other embodiments, the context may be manually specified.

In some embodiments, relationships between constraints are determined utilizing context and a supervised machine learning algorithm. The supervised machine learning algorithm may be run on a corpus (e.g., the regulatory documents 201) that are annotated manually. A list of constraints may be analyzed by looking at the sentences, paragraphs, or other portions of the regulatory document before and after specification of the respective constraints. For example, if the sentence or other section of the regulatory document prior to the list of constraints has the string "at least one of the following," then a logical OR relation is defined; if the sentence or other section of the regulatory document prior to the list of constraints has the string "all of the following," then a logical AND relation is defined; and if the sentence or other section of the regulatory document prior to the list of constraints has the string "none of the following," then a logical NOT relation is defined.

The various relationships between the constraints are used to combine the extracted constraint triples to form constraint satisfaction or satisfiability formulas. In some embodiments, the constraint satisfiability formulas take the form of Boolean formulas, where each constraint triple is a variable. The constraint satisfiability formulas are also referred to herein as "regulations."

Figure 4:
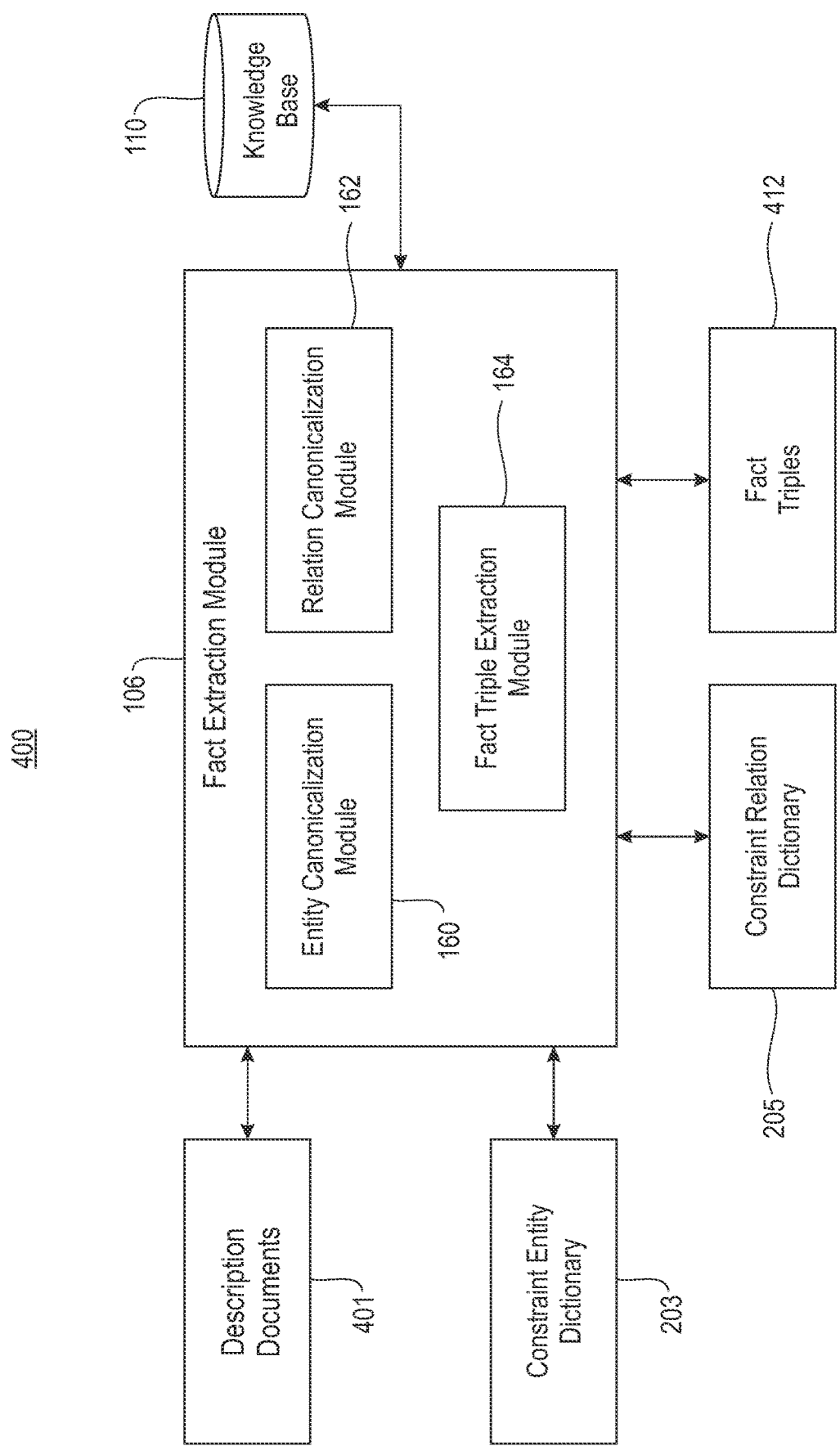
FIG. 4 depicts a processing flow for the facts extraction module of the FIG. 1 system, according to an exemplary embodiment of the present invention.

FIG. 4 shows a processing flow 400 for the fact extraction module 106. The fact extraction module 106 implements an entity canonicalization module 160, a relation canonicalization module 162, and a fact triple extraction module 164. The entity canonicalization module 160 and relation canonicalization module 162 provide functionality similar to that of entity canonicalization module 120 and relation canonicalization module 122, but for description documents 401 rather than regulatory documents 201.

The entity canonicalization module 160 is configured to canonicalize or identify entities from the description documents 401, while the relation canonicalization module 162 is configured to canonicalize or identify relations between entities from the description documents 401. This processing may utilize the constraint entity dictionary 203 and constraint relation dictionary 205. The modules 160 and 162 may further utilize the ontology provided by knowledge base 110. The entity canonicalization module 160 parses the description documents 401 for entities of interest, which are instances of the entity types mentioned in the constraint entity dictionary 203. The relation canonicalization module 162 parses the description documents 401 to identify relations of interest from the constraint relation dictionary 205, which are relations that describe properties of the entities (e.g., hypernym, meronym, co-hyponym relations, etc.).

The fact triple extraction module 164 is configured to extract facts from the description documents 401 in the form of fact triples 412. The fact triples 412 are sets of triples with corresponding types for the entities and relations canonicalized or identified by the entity canonicalization module 160 and relation canonicalization module 162.

Figure 5:
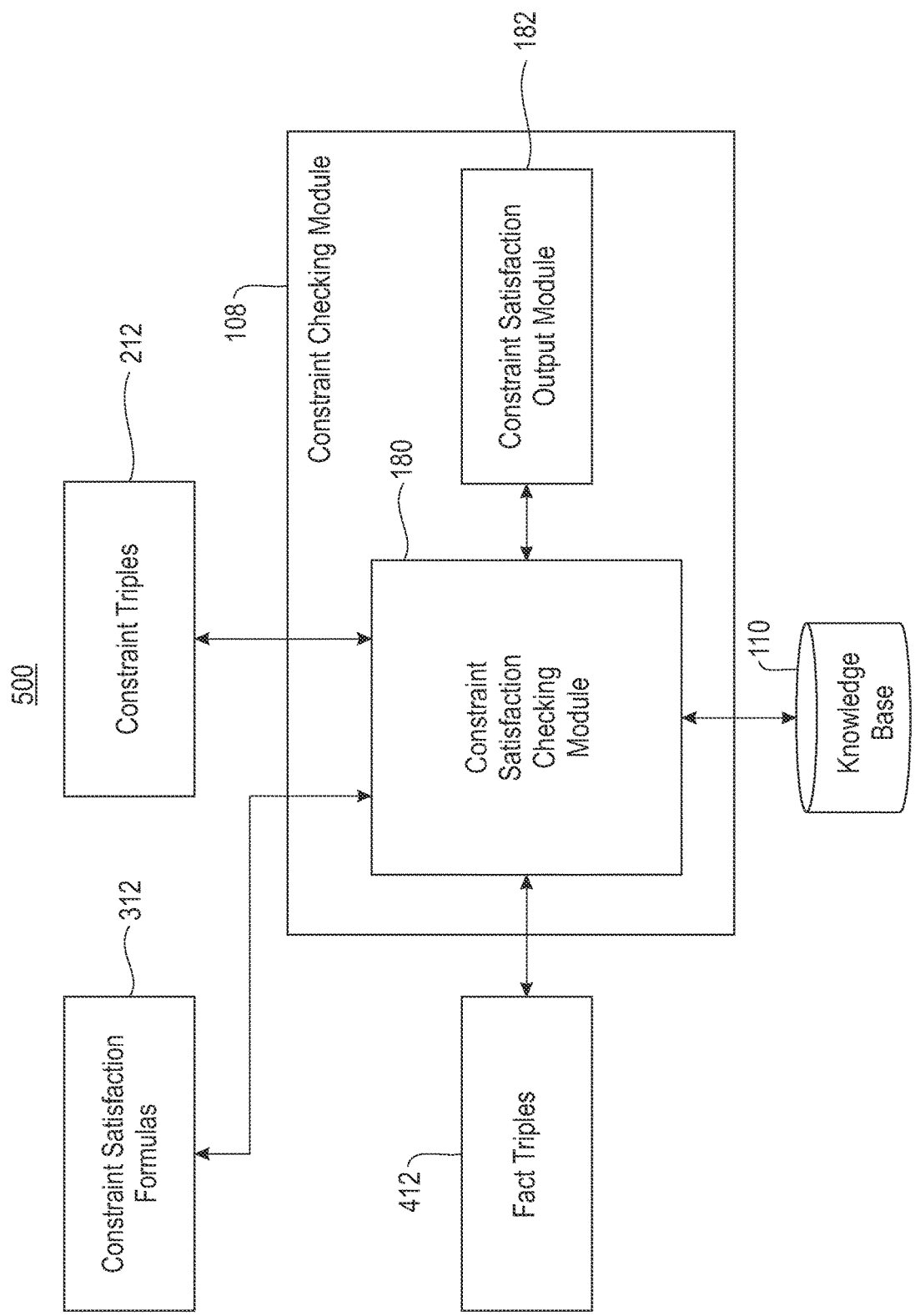
FIG. 5 depicts a processing flow for the constraint checking module of the FIG. 1 system, according to an exemplary embodiment of the present invention.

FIG. 5 shows a processing flow 500 for the constraint checking module 108. The constraint checking module 108 implements a constraint satisfaction checking module 180 and a constraint satisfaction output module 182. The constraint satisfaction checking module 180 checks if a constraint triple is satisfied. A constraint triple of interest is denoted as $ct_i=<cs,cp,co>$ where cs is the subject, cp is the predicate, and W is the object. The constraint satisfaction checking module 180 may utilize the fact triples 412 to identify fact triple instances that have the same predicate as the constraint triples 212. An example matching fact triple is denoted as $ft=<fs,fp,fo>$, where fs is the subject, fp is the predicate (and fp=cp in that this is a matching fact triple), and fo is the object. By tracing a hypernym in the extracted fact triples 412, or by the linking of the entity to the knowledge base 110, the constraint satisfaction checking module 180 checks if <fs,hypernym,cs> and <fo,hypernym,co> are true. If <fs,hypernym,cs> and <fo,hypernym.co> are true, then the constraint triple $c_t=<cs,cp,co>$ is marked as satisfied. Once this is done for every fact triple, the values (e.g., true/false) of the constraint triples are substituted into the appropriate one of the constraint satisfaction formulas 312. The constraint satisfaction formula with such substituted values is then evaluated to check if a regulation is satisfied. In some embodiments, the constraint satisfaction checking module 180 checks how many of a set of constraints are satisfied.

The constraint satisfaction output module 182 provides results of the processing from the constraint satisfaction checking module 180. For example, the constraint satisfaction output module 182 may provide an output indicating whether a particular constraint is satisfied (e.g., yes/no). The constraint satisfaction output module 182 may also or alternatively provide a satisfaction score (e.g., a letter grade such as A, B, C, D, F, a percentage, a numeric score in some designated range, etc.) as output. The constraint satisfaction output module 182 may further output lists of satisfied constraints, unsatisfied constraints, and non-specified constraints.

The processing of system 100 will now be described with reference to an illustrative example in the banking context described above. Consider a regulation specified in one of the regulatory documents 201 of: "foreign banks which want to open branches in India should have headquarters in the capital city of their respective countries, and can open branches only in metro cities in India." The constraint extraction module 102 utilizes the entity canonicalization module 120 to extract the constraint entities as: {foreign bank, capital city, metro city, country, India, bank, metro, foreign}. The constraint extraction module 102 utilizes the relation canonicalization module 122 to extract the relations as: {headquartered in, open branch, in}. From this, the constraint triple extraction module 124 extracts the following constraint triples: {<foreign bank, headquartered in, capital city>, <foreign bank, open branch, metro city>, <metro city, in, India>}.

The constraint formula extraction module 104 parses the constraint triples to identify relations therebetween. In this example, there is an AND relationship between the constraint triples {<foreign bank, headquartered in, capital city>, <foreign bank, open branch, metro city>, <metro city, in, India>}, meaning that each must be true for the regulation to be satisfied.

Consider also the following portions of the fact documents 401 specifying that: (i) "Deutsche Bank is a foreign bank headquartered in the German capital city of Berlin"; and (ii) "metro cities in India, such as Delhi and Bangalore, are fast becoming gateways for foreign banks to enter India." The fact extraction module 106 utilizes the entity canonicalization module 160 and relation canonicalization module 162 to obtain the entities and relations of interest from these statements. The fact triple extraction module 164 then extracts the following fact triples: {<Deutsche Bank, is, foreign bank>, <Deutsche Bank, headquartered in, Berlin>, <Berlin, capital city of, Germany>, <Bangalore, is, metro city>, <Delhi, is, metro city>, <Bangalore, in, India>, <Delhi, in, India>}.

The constraint checking module 108 utilizes the constraint satisfaction checking module 180 to analyze the extracted fact triples and constraint triples to determine whether the regulation is satisfied. Starting with the constraint triple <foreign bank, headquartered in, capital city>, the fact triples are analyzed to find those with predicates that match the predicate (e.g., "headquartered in") of the constraint triple. This leads first to identifying the fact triple <Deutsche Bank, headquartered in, Berlin>. Hypernym tracing is then performed for the subject and object of the constraint triple. The hypernym of the object of the fact triple <Deutsche Bank, headquartered in. Berlin> is parsed to identify the fact triple <Berlin, is, capital city>. The hyponym of the subject of the fact triple <Deutsche Bank, headquartered in, Berlin> is parsed to identify the fact triple <Deutsche Bank, is, foreign bank>. Collectively, the fact triples <Deutsche Bank, is, foreign bank><Deutsche Bank, headquartered in, Berlin><Berlin, is, capital city> are evaluated to determine that the constraint triple <foreign bank, headquartered in, capital city> is true.

Next, the constraint triple <metro city, in, India> is evaluated. A fact triple with a matching predicate is then selected (e.g., <Bangalore, in, India>). From this, hypernym tracing is applied to identify the fact triple <Bangalore, is, metro city>. Collectively, this is: <Bangalore, is, metro city><metro city, in, India><Bangalore, in, India> and thus the constraint triple <metro city, in, India> is true.

Finally, the constraint triple <foreign bank, open branch, metro city> is evaluated. This constraint triple is evaluated by replacing the values with fact triples. For example, the subject "foreign bank" is replaced with "Deutsche bank" using fact triple <Deutsche bank, is, foreign bank>. Similarly, the object "metro city" is replaced with "Bangalore" using fact triple "Bangalore, is, metro city." The constraint triple <foreign bank, open branch, metro city> is thus true.

In this example, the satisfaction output module 182 outputs that the regulations are satisfied. If, however, not all regulations are satisfied, the satisfaction output module 182 may provide as part of its output the set of constraints that are not satisfied. In some embodiments a minimal set of unsatisfied constraints is output, so as to guide the user on the minimum requirements for the regulations. Finding the minimal set of unsatisfied constraints can be formulated as a combinatorial optimization problem. Constraint triples may be extracted as described above with respect to FIG. 2. The various constraint triples may be combined to generate constraint satisfaction formulas (e.g., regulations) as described above with respect to FIG. 3. Consider, for example, a regulation or constraint satisfaction formula of (constraint triple 1 OR constraint triple 2 OR constraint triple 3) AND (constraint triple 4 OR constraint triple 5) AND (constraint triple 6 OR constraint triple 7 OR constraint triple 8). Fact triples may be extracted as described above with respect to FIG. 4. Finding the minimal set of unsatisfied constraints may then be accomplished through evaluating such constraint satisfaction formulas using the extracted fact triples.

It should be appreciated that the above example is provided solely to illustrate operation of the system 100, and that embodiments are not limited to use with the particular entities, relations, constraint triples, constraint formulas, fact triples, etc. described. For ease of explanation, it was assumed that only a single constraint statement was used in the input regulatory document. In other embodiments, however, any desired number of constraint statements may be part of the same input regulatory document, or a collection of regulatory documents may be provided as input each having one or more constraint statements. After co-reference resolution, each of the constraint statements can be processed independently or in a collective fashion.

Also, while the above example is described with respect to identifying each constraint as satisfied or not, some embodiments may provide or assign confidence scores to some or all of the constraints in addition to or in place of the yes/no or satisfied/unsatisfied designation.

In some embodiments, different types of triple extraction techniques may be utilized. Triple extraction techniques may use numerical concepts and relations, may mine tables for extraction, etc. Triple extraction techniques include but are not limited to rules-based methods (e.g., using Hearst patterns), pattern-based methods (e.g., using Never-Ending Language Learning (NELL), Open Language Learning for Information Extraction (OLLIE), ReVerb, relational machine learning techniques, etc.), natural-language processing (e.g., using the Stanford NLP).

Further, in some embodiments the system 100 may take as input user specification of the main entities of interest, with the processing being limited to such entities of interest.

In some embodiments, the textual content of the textual descriptions of a set of constraints is leveraged to identify subsets of the constraints that are necessary (e.g., logical AND), optional (e.g., logical OR) or negated (e.g., logical NOT). The constraints are then aggregated to extract a representation of the constraints described in the text as testable formulae. Embodiments further provide for automatically extracting facts about entities described in text, where the entities are based on extracted constraints specified in a different text. Embodiments may further provide for identifying a minimal subset of constraints that are not currently satisfied by an entity described in the text.

Figure 6:
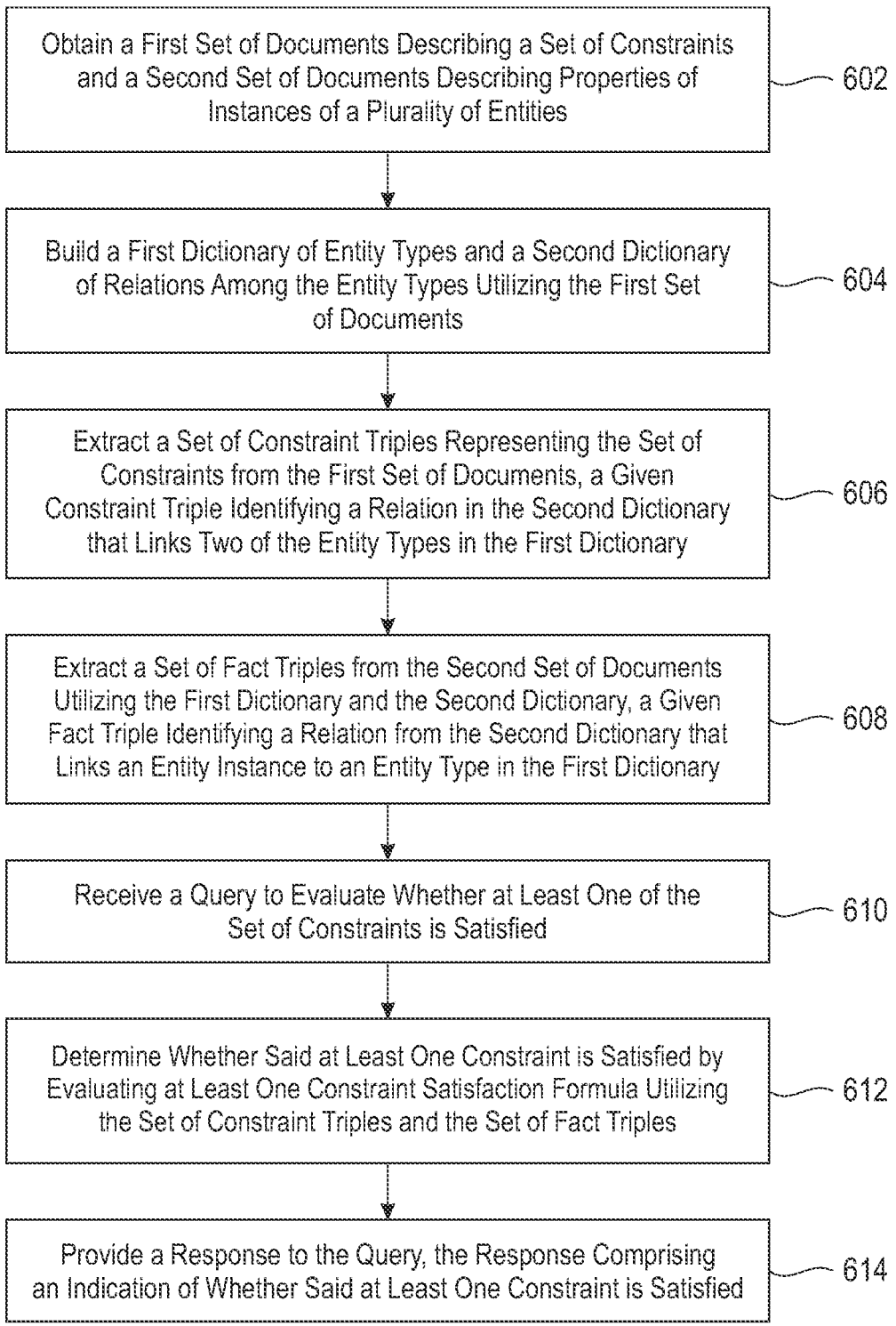
FIG. 6 depicts a process for extracting constraints, according to an exemplary embodiment of the present invention.

FIG. 6 depicts a processing flow 600 for extracting constraints. The processing flow 600 begins with step 602, obtaining a first set of documents (e.g., regulatory documents 201) describing a set of constraints and a second set of documents (e.g., description documents 401) describing properties of instances of a plurality of entities. In some embodiments, the first and second sets of documents are dynamically obtained from a data source that pushes such documents in response to changes or updates therein. In step 604, a first dictionary (e.g., constraint entity dictionary 203) of entity types and a second dictionary (e.g., constraint relation dictionary 205) of relations among the entity types are built utilizing the first set of documents. Step 604 may include building the first dictionary by canonicalizing entity types in the first set of documents utilizing one or more entity linking techniques. Step 604 may further include building the second dictionary by canonicalizing relations in the first set of documents utilizing one or more embedding methods.

In step 606, a set of constraint triples (e.g., constraint triples 212) representing the set of constraints is extracted from the first set of documents. Each constraint triple may identify a relation in the second dictionary that links two of the entity types in the first dictionary. Step 606 may include using a third dictionary of relational terms to determine whether respective ones of the constraint triples comprise necessary, optional or negated relationships among entity types.

In step 608, a set of fact triples (e.g., fact triples 412) are extracted from the second set of documents utilizing the first dictionary and the second dictionary. Each of the fact triples may identify a relation from the second dictionary that links an entity instance to an entity type in the first dictionary. Step 608 may include extracting fact triples that have at least one of a relation of interest and an entity instance of interest. The relations of interest may include relations in the second dictionary, and relations that describe properties of the entity instances. The entity instances of interest may include entity instances of the entity types in the first dictionary.

The process 600 continues with receiving a query in step 610. The query includes a request for evaluating whether at least one of the set of constraints is satisfied. The query may be submitted to the system 100 from a client device over at least one network, such as using an application programming interface (API) of the system 100 that permits queries to be sent to the system 100. In step 612, a determination is made as to whether the at least one constraint is satisfied by evaluating at least one constraint satisfaction formula (e.g., at least one of the constraint satisfaction formulas 312) utilizing the set of constraint triples and the set of fact triples.

The constraint satisfaction formula used in step 612 may combine two or more of the set of constraint triples utilizing context from the first set of documents to identify relationships between the two or more constraint triples. The constraint satisfaction formula may combine the two or more constraint triples as a Boolean formula, where each of the two or more constraint triples is a variable of the Boolean formula. The relationships between the two or more constraint triples may comprise logical AND, OR and NOT statements.

Evaluating the constraint satisfiability formula may comprise, for a given constraint triple, identifying a subset of the fact triples having the same relation as the given constraint triple and hypernym tracing the subset of fact triples to link entity instances in the subset of fact triples to the entity types of the given constraint triple. The given constraint triple may be marked as satisfied responsive to determining that the subset of fact triples includes: a first fact triple having the same relation as the given constraint triple; a second fact triple that links a first entity instance of an object of the second fact triple to an entity type of an object of the given constraint triple using at least one hypernym; and a third fact triple that links a second entity instance of a subject of the third fact triple to an entity type of the subject of the given constraint triple using at least one hypernym.

In step 614, a response to the query is provided. The response may be provided over the same or a different API or other channel from which the query was received. The response includes an indication of whether the at least one constraint is satisfied. The response may comprise a yes or no indication as to whether said at least one constraint is satisfied, a number of constraints that are satisfied, a list of constraints that are satisfied, a list of constraints that are not satisfied, etc.

Figure 7:
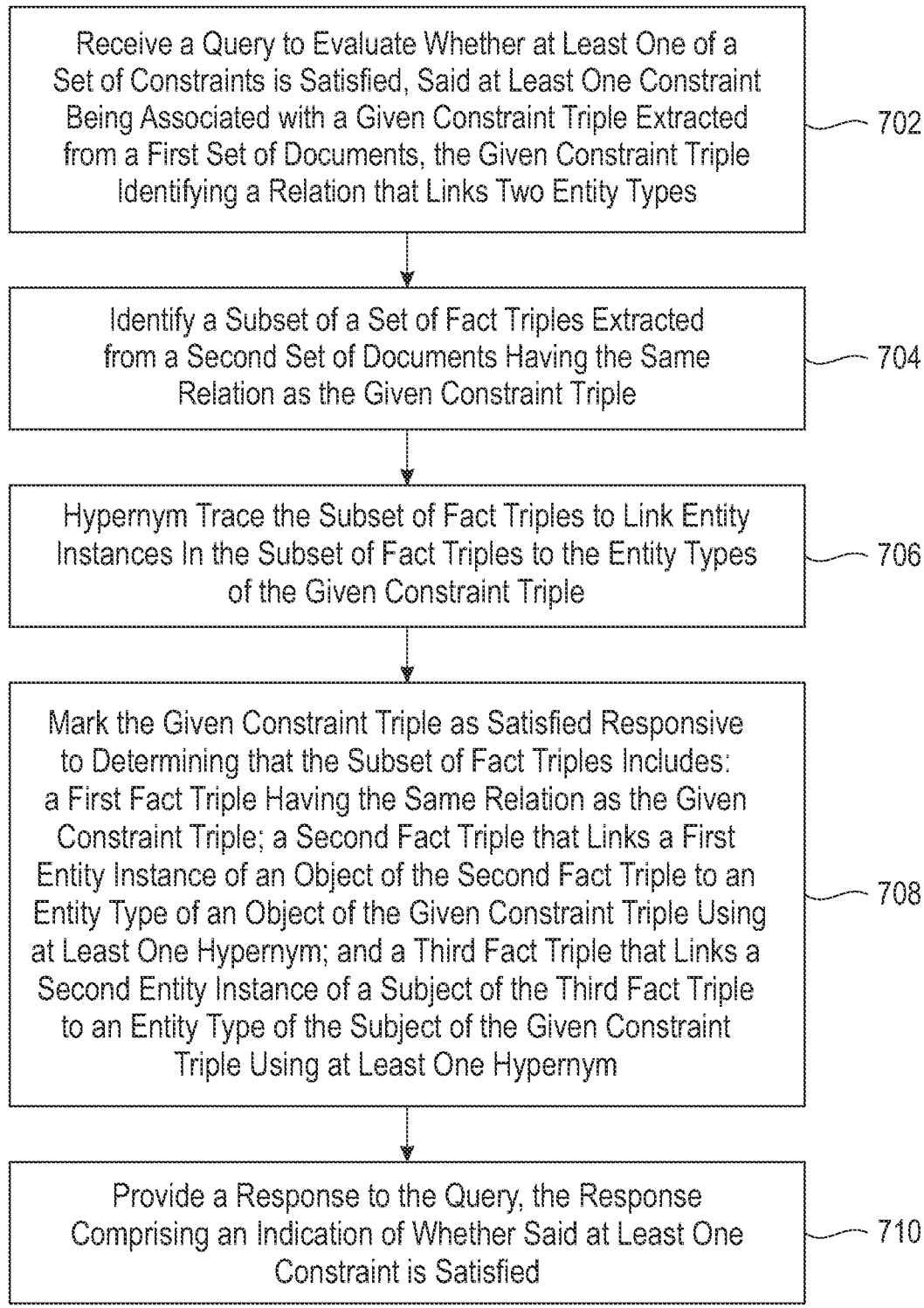
FIG. 7 depicts a process for testing constraints, according to an exemplary embodiment of the present invention.

FIG. 7 depicts a processing flow 700 for testing constraints. The processing flow 700 begins with step 702, receiving a query to evaluate whether at least one of a set of constraints is satisfied. The at least one constraint is associated with a given constraint triple (e.g., one of constraint triples 212) that is extracted from a first set of documents (e.g., regulatory documents 201). The given constraint triple identifies a relation that links two entity types.

In step 704, a subset of a set of fact triples (e.g., fact triples 412) extracted from a second set of documents (e.g., description documents 401) having the same relation as the given constraint triple are identified. Hypernym tracing of the subset of fact triples is performed in step 706 to link entity instances in the subset of fact triples to the entity types of the given constraint triple. The given constraint triple is marked as satisfied in step 708 responsive to determining that the subset of fact triples includes: a first fact triple having the same relation as the given constraint triple; a second fact triple that links a first entity instance of an object of the second fact triple to an entity type of an object of the given constraint triple using at least one hypernym; and a third fact triple that links a second entity instance of a subject of the third fact triple to an entity type of the subject of the given constraint triple using at least one hypernym. In step 710, a response to the query is provided, where the response comprises an indication of whether the at least one constraint is satisfied.

The at least one constraint in the query received in step 702 may include two or more constraint triples associated with a constraint satisfaction formula (e.g., one of the constraint satisfaction formulas 312). The constraint satisfaction formula combines the two or more constraint triples utilizing context from the first set of documents to identify relationships between the two or more constraint triples. The constraint satisfaction formula may combine the two or more constraint triples as a Boolean formula where each of the two or more constraint triples is a variable of the Boolean formula.

Illustrative embodiments provide systems and methods for automatically determining and extracting constraints from regulatory documents by canonicalizing the regulatory documents with textual specification, such as using an ontology or other knowledge base. The extracted constraints are tested for satisfaction with variables and entities described in the text of description documents.

In some embodiments, a knowledge base of regulatory documents is constructed with an ontology, and the regulatory documents are canonicalized in accordance with the ontology to identify entities and relations in the textual specification of the regulatory documents. Constraints are automatically extracted from the regulatory documents (e.g., in the form of constraint triples). The constraints may be interrelated, such as sets of constraints that are necessary, optional or negated (e.g., logical AND, OR and NOT) by leveraging and aggregating the textual context of the descriptions of the set of constraints using the identified entities and relations. Satisfaction of the extracted constraints is validated or tested by scoring and tracing hypernyms from sets of extracted fact triples, and linking scored hypernyms into the constraint formulas.

In some embodiments, two knowledge bases are used. A first knowledge base includes constraints and policies extracted from regulatory documents, and the second knowledge base includes facts extracted from description documents. Textual descriptions of policies or constraints in the regulatory documents are converted to a canonicalized knowledge base. This provides various advantages relative to conventional techniques, which do not automatically extract constraints or policies from regulatory documents. To the contrary, conventional techniques often require that constraints or policies be given in a computer executable or readable format. Illustrative embodiments allow for automatically extracting policies or constraints in a computer executable format from regulations given in the text of regulatory documents, where the regulatory documents may be difficult to understand due to long sentences, difficult language, etc.

Conventional techniques which assume that policies or constraints are given in a computer-executable form also assume that there is an ontology that will provide required fields from a database to populate the variables in the computer-executable form to check if the policies or constraints are satisfied. Some embodiments provide for hypernym tracing, which provides various advantages and does not require that such a database be available.

Conventional techniques are often limited to monitoring policy or constraint violations on a set of static policies. Conventional techniques do not provide the ability to extract data and policies from regulatory documents and description documents. Further, conventional techniques are limited in that they are unable to handle cases where the data and policies change regularly. Illustrative embodiments, which allow for the automatic extraction of constraints and facts from regulatory and description documents, can be used in such environments where either the data or the policies change over time.

In some embodiments, data to be extracted from description documents are canonicalized by looking at the extracted information from regulatory documents (e.g., using constraint entity and relation dictionaries 203 and 205 as discussed above). This advantageously helps prevent noisy and incorrect extractions.

Some conventional techniques require a defined ontology to be cognizant of entity descriptions and policy variables (e.g., surfaced as knowing which fields from a database to use for populating the policy). This leads to various drawbacks when there are even slight changes to a policy, when new policies are created, when new data tables are created, etc., as the entire ontology needs to be recalibrated. Illustrative embodiments, which provide automated techniques for extracting constraints and facts, avoid these issues.

Conventional techniques often rely or depend on manual effort to specify regulations, facts, etc. Conventional techniques, for example, may rely on a human analyst to manually align a regulatory sentence with concepts coming from an ontology. This simply serves to enrich the text to a semi-formal text, with extra information coming from an ontology. As a result, such conventional techniques merely produce regulations with extra metadata. Such an approach does not provide for automatic extraction of a knowledge base as described herein.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (IAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
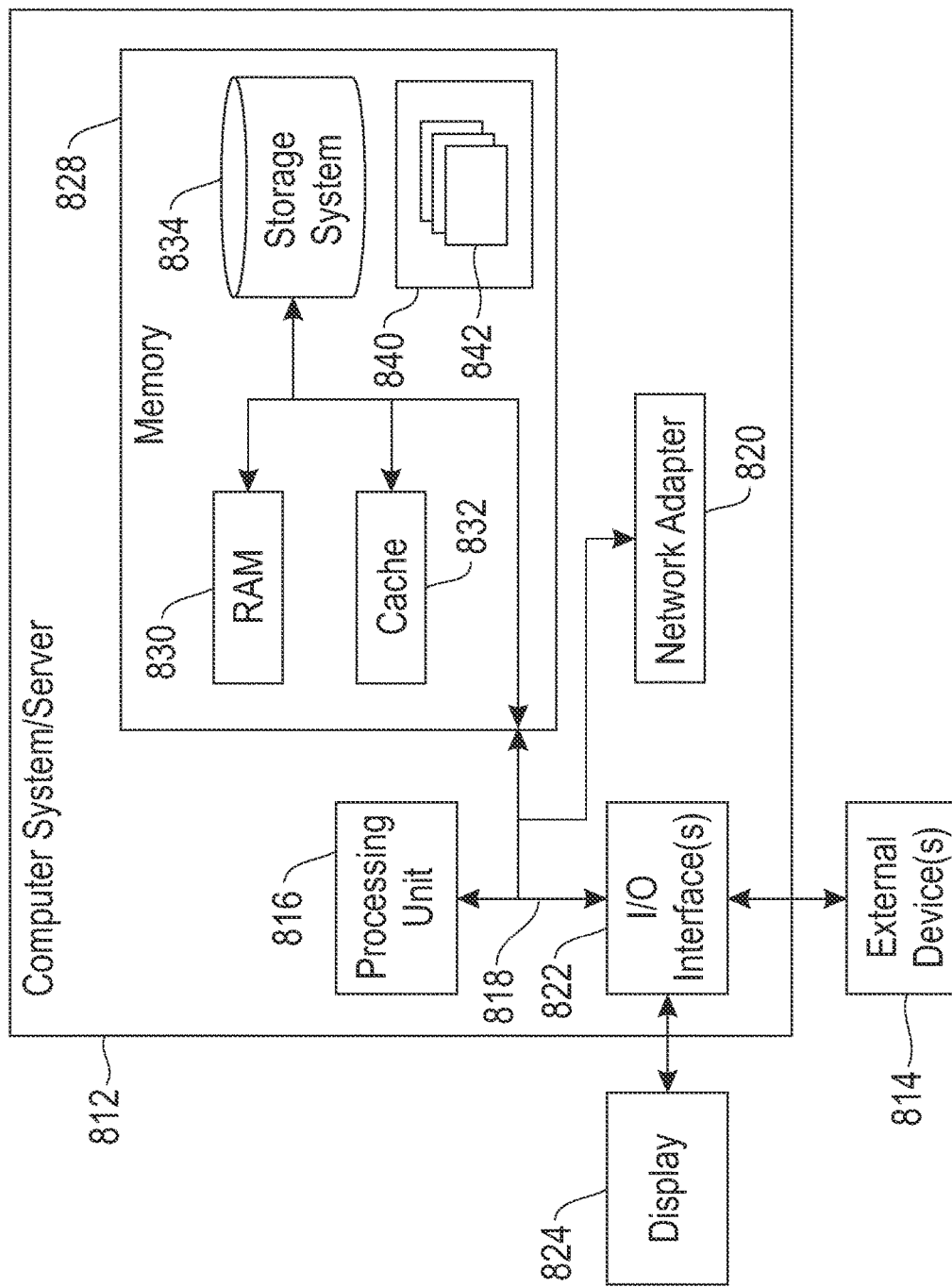
FIG. 8 depicts a computer system in accordance with which one or more components/steps of techniques of the invention may be implemented, according to an exemplary embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via I/O interfaces 822. Still yet, computer system/server 812 can communicate with one or more networks such as a LAN, a general WAN, and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
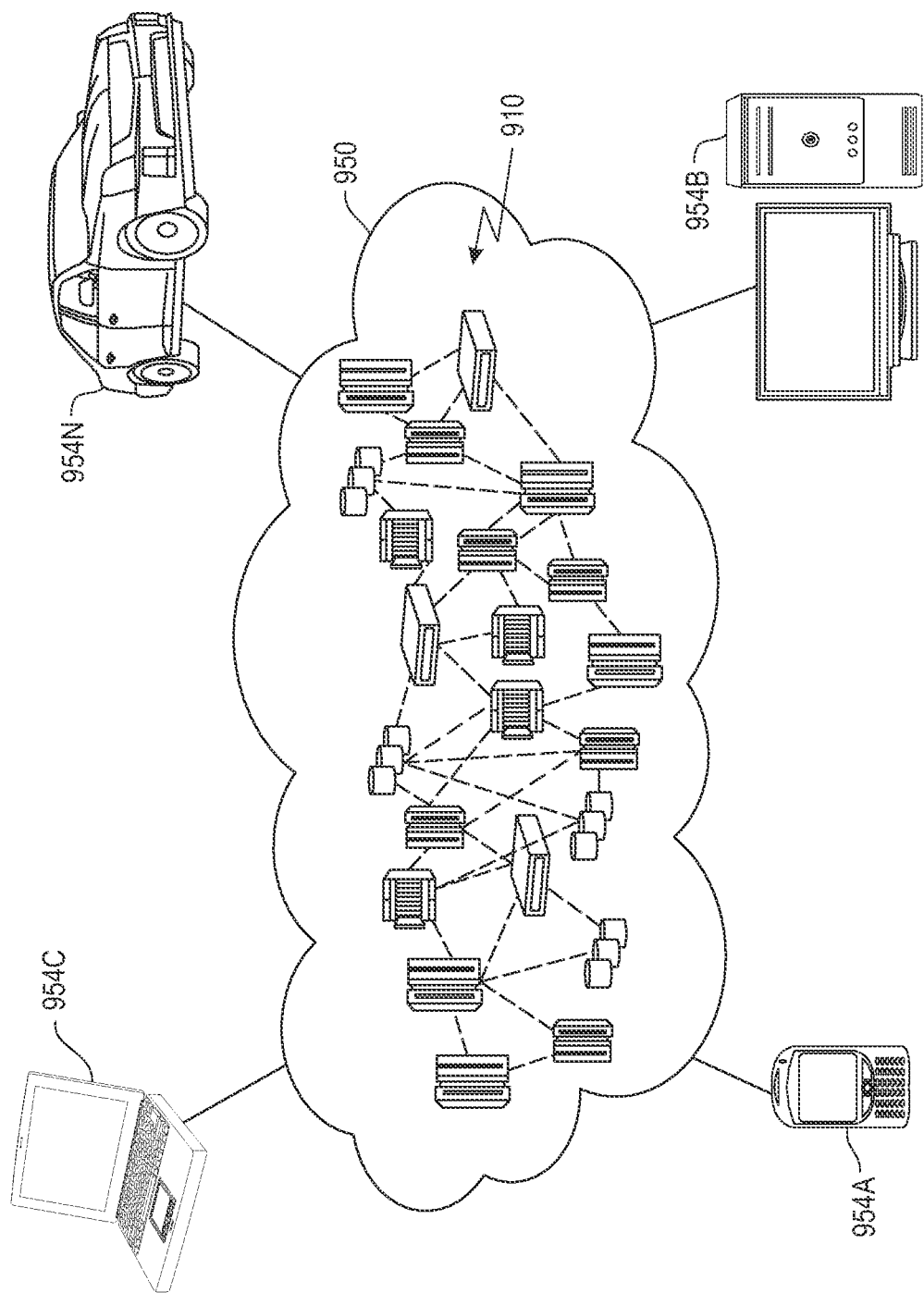
FIG. 9 depicts a cloud computing environment, according to an exemplary embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
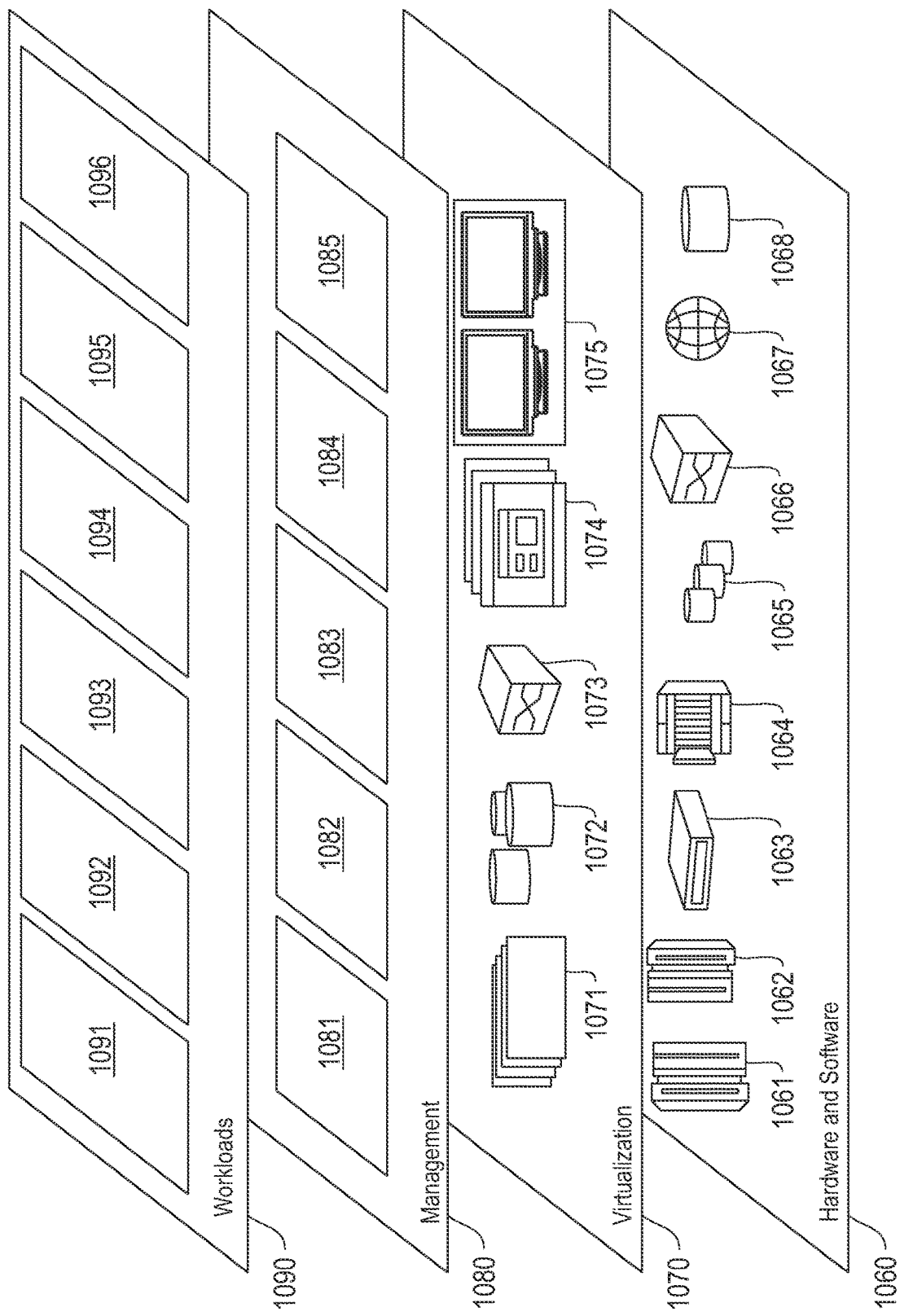
FIG. 10 depicts abstraction model layers, according to an exemplary embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and constraint extraction and testing processing 1096, which may perform various functions described above with respect to the FIG. 1 system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a query to evaluate whether at least one of a set of constraints is satisfied, said at least one constraint being associated with (i) a given constraint triple extracted from a first set of documents and (ii) a constraint satisfaction formula, the given constraint triple identifying a relation that links two entity types, and wherein the constraint satisfaction formula combines two or more constraint triples utilizing context from the first set of documents and a supervised machine learning algorithm to identify relationships between the two or more constraint triples;
identifying a subset of a set of fact triples extracted from a second set of documents having the same relation as the given constraint triple;
hypernym tracing the subset of fact triples to link entity instances in the subset of fact triples to the entity types of the given constraint triple;
marking the given constraint triple as satisfied, responsive to determining that the subset of fact triples includes: a first fact triple having the same relation as the given constraint triple; a second fact triple that links a first entity instance of an object of the second fact triple to an entity type of an object of the given constraint triple using at least one hypernym; and a third fact triple that links a second entity instance of a subject of the third fact triple to an entity type of the subject of the given constraint triple using at least one hypernym; and
providing a response to the query, the response comprising an indication of whether said at least one constraint is satisfied;
wherein the method is carried out by at least one processing device.

2. The computer-implemented method of claim 1, wherein the constraint satisfaction formula combines the two or more constraint triples as a Boolean formula where each of the two or more constraint triples is a variable of the Boolean formula.

3. The computer-implemented method of claim 1, wherein the relationships between the two or more constraint triples comprise logical AND, OR and NOT statements.

4. The computer-implemented method of claim 1, wherein said identifying a subset of a set of fact triples comprises identifying a subset of a set of fact triples having at least one of: (i) a relation of interest; and (ii) an entity instance of interest.

5. The computer-implemented method of claim 4, wherein the relation of interest comprises a relations that describes one or more properties of at least one of the two entity instances.

6. The computer-implemented method of claim 1, wherein the response comprises at least one of:
a yes or no indication as to whether said at least one constraint is satisfied;
a number of constraints that are satisfied;
a list of constraints that are satisfied; and
a list of constraints that are not satisfied.

7. A computer program product, the computer program product comprising a computer readable storage medium having program instructions embodied therewith, the program instructions executable by at least one computing device to cause the at least one computing device to perform steps of:
receiving a query to evaluate whether at least one of a set of constraints is satisfied, said at least one constraint being associated with (i) a given constraint triple extracted from a first set of documents and (ii) a constraint satisfaction formula, the given constraint triple identifying a relation that links two entity types, and wherein the constraint satisfaction formula combines two or more constraint triples utilizing context from the first set of documents and a supervised machine learning algorithm to identify relationships between the two or more constraint triples;
identifying a subset of a set of fact triples extracted from a second set of documents having the same relation as the given constraint triple;
hypernym tracing the subset of fact triples to link entity instances in the subset of fact triples to the entity types of the given constraint triple;
marking the given constraint triple as satisfied, responsive to determining that the subset of fact triples includes: a first fact triple having the same relation as the given constraint triple; a second fact triple that links a first entity instance of an object of the second fact triple to an entity type of an object of the given constraint triple using at least one hypernym; and a third fact triple that links a second entity instance of a subject of the third fact triple to an entity type of the subject of the given constraint triple using at least one hypernym; and
providing a response to the query, the response comprising an indication of whether said at least one constraint is satisfied.

8. The computer program product of claim 7, wherein the constraint satisfaction formula combines the two or more constraint triples as a Boolean formula where each of the two or more constraint triples is a variable of the Boolean formula.

9. The computer program product of claim 7, wherein the relationships between the two or more constraint triples comprise logical AND, OR and NOT statements.

10. The computer program product of claim 7, wherein said identifying a subset of a set of fact triples comprises identifying a subset of a set of fact triples having at least one of: (i) a relation of interest; and (ii) an entity instance of interest.

11. The computer program product of claim 10, wherein the relation of interest comprises a relations that describes one or more properties of at least one of the two entity instances.

12. The computer program product of claim 7, wherein the response comprises at least one of:
a yes or no indication as to whether said at least one constraint is satisfied;
a number of constraints that are satisfied;
a list of constraints that are satisfied; and
a list of constraints that are not satisfied.

13. A system comprising:
a memory; and
at least one processor coupled to the memory and configured for:
receiving a query to evaluate whether at least one of a set of constraints is satisfied, said at least one constraint being associated with (i) a given constraint triple extracted from a first set of documents and (ii) a constraint satisfaction formula, the given constraint triple identifying a relation that links two entity types, and wherein the constraint satisfaction formula combines two or more constraint triples utilizing context from the first set of documents and a supervised machine learning algorithm to identify relationships between the two or more constraint triples;

identifying a subset of a set of fact triples extracted from a second set of documents having the same relation as the given constraint triple;

hypernym tracing the subset of fact triples to link entity instances in the subset of fact triples to the entity types of the given constraint triple;

marking the given constraint triple as satisfied, responsive to determining that the subset of fact triples includes: a first fact triple having the same relation as the given constraint triple; a second fact triple that links a first entity instance of an object of the second fact triple to an entity type of an object of the given constraint triple using at least one hypernym; and a third fact triple that links a second entity instance of a subject of the third fact triple to an entity type of the subject of the given constraint triple using at least one hypernym; and providing a response to the query, the response comprising an indication of whether said at least one constraint is satisfied.

14. The system of claim 13, wherein the constraint satisfaction formula combines the two or more constraint triples as a Boolean formula where each of the two or more constraint triples is a variable of the Boolean formula.

15. The system of claim 13, wherein the relationships between the two or more constraint triples comprise logical AND, OR and NOT statements.

16. The system of claim 13, wherein said identifying a subset of a set of fact triples comprises identifying a subset of a set of fact triples having at least one of: (i) a relation of interest; and (ii) an entity instance of interest.

17. The system of claim 16, wherein the relation of interest comprises a relations that describes one or more properties of at least one of the two entity instances.

* * * * *